W. KIDDER.
Gas Regulator.
No. 244. Reissued June 28, 1853.
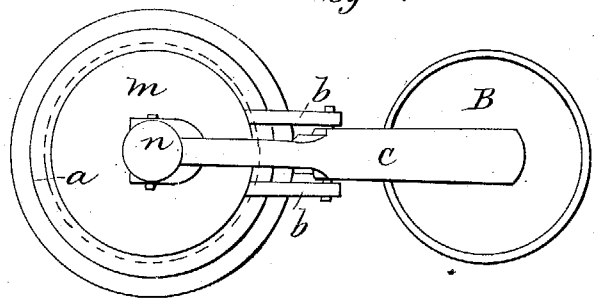
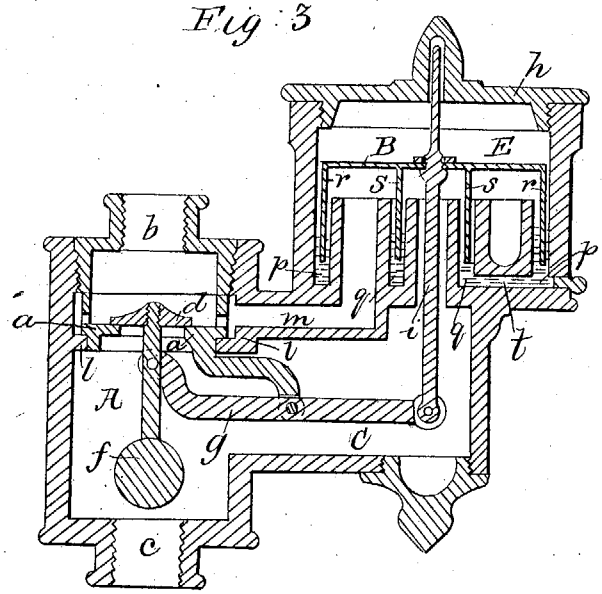
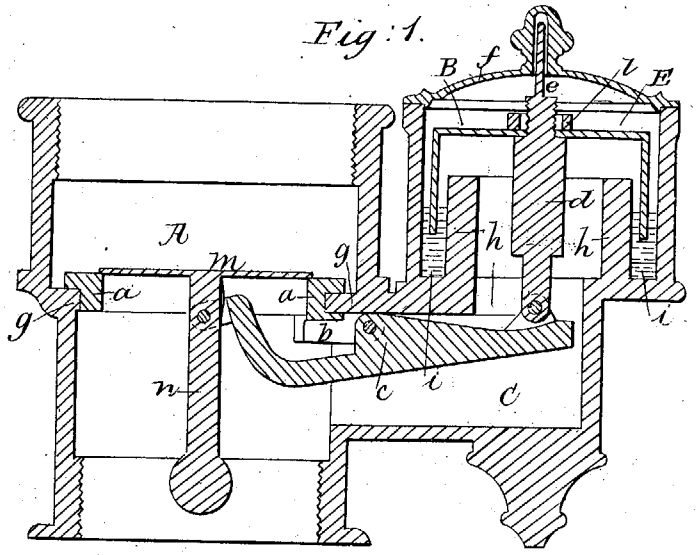
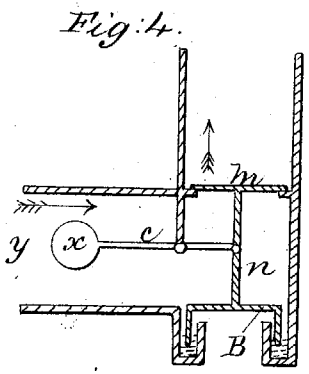
N. PETERS, Photo-Lithographer, Washington, D. C.

UNITED STATES PATENT OFFICE.

WALTER KIDDER, OF NEW YORK, N. Y.

IMPROVEMENT IN GAS-REGULATORS.

Specification forming part of Letters Patent No. 9,327, dated October 12, 1852; Reissue No. 244, dated June 28, 1853.

*To all whom it may concern:*

Be it known that I, WALTER KIDDER, of the city, county, and State of New York, have invented certain new and useful Improvements in Gas-Regulators; and I do hereby declare that the following is a full, clear, and exact description thereof, reference being had to the accompanying drawings, making part of this specification, in which—

Figure 1 is a vertical section of my improved governor or regulator; Fig. 2, a bottom view of the valve and disk, and Figs. 3 and 4 vertical sections of modifications.

My invention relates to the method of regulating or governing the pressure of gas at the burners, so as to issue therefrom with a regular pressure irrespective of the varying pressure in the main and of the number of burners used. Many attempts have been made before my invention to effect this purpose, but without success. It is known that the pressure of gas in the main changes considerably from various causes, and that this variation is increased in the branches by the varying quantity of gas consumed, and it is also known that these variations are wasteful of gas.

As the object is to govern the pressure of the gas supplied to the burners, the valve which governs the aperture leading from the main to the branches should be governed by the pressure of the gas in the branches—that is, by the gas after it has passed the valve—reducing the aperture when the pressure is too great to reduce the supply, and enlarging it to increase the supply when the pressure is too low. Various devices have been invented to effect this purpose. A valve governing the aperture for the passage of the gas has been connected with a disk presenting its surface to the pressure of the gas in the branch—that is, to the pressure of the gas after it has passed the valve—so that when the pressure increases, the surface of the disk being larger than the surface of the valve, this increased pressure on the disk should preponderate and close the valve, and permit it to open again as the pressure is reduced by the reduction of the supply. This, however, is defective, for the reason that the two surfaces of the valve are exposed to the varying pressure of the gas—one surface to the pressure in the main and the other to the pressure in the branch—from which it follows that the mode above indicated cannot govern the pressure in the branch, as it merely provides for the varying pressure on one face of the valve and leaves the other without compensation. This difficulty I have avoided by my invention, which consists in balancing the varying pressure of the gas in the main by connecting with the valve a disk or balancing surface equal to the surface of the valve, or using a balance-valve, so that whatever may be the variation of pressure in the main the valve will be in equipoise, so far as regards that pressure, when this is combined with a mode of governing the size of the aperture through which the gas passes to the branch by the pressure of the gas beyond the valve, so that when that pressure increases the valve will be carried toward its seat to reduce the supply, and hence the pressure, and vice versa, which latter mode of regulation I effect either by the pressure of the gas on the face, which would tend to close it, and acting against a weight, or its equivalent, which tends to open it, and which can be set or adjusted to any desired pressure, or by causing the gas in the branch to press on the surface of a disk in addition to the valve, so as to present a larger surface to the pressure of the gas, the better to effect the regulation of the supply, and hence the pressure at the burners.

In Figs. 1 and 2 of the accompanying drawings, A represents a vessel to be connected by its lower end with the main, and by the upper end with the branch which supplies the burners. This vessel is connected with another vessel, E, by a neck or passage, C, so that the gas in the main shall have free access to the lower part of both vessels. About the middle of the vessel A there is a stricture, *g g*, to which is fitted a valve-seat, *a*, and to this is fitted a disk-valve, *m*, provided with a central stem, *n*, jointed to one arm of a lever, *c*, the middle of which turns on a fulcrum-pin sustained in bracket-pieces *b b*. The stem *n* of the valve should be made of sufficient weight and length to keep the surface of the valve in a horizontal plane.

To the opposite end of the lever *c* is jointed a rod, *d*, which is kept in a vertical or nearly vertical position by having its upper end, *e*, of a reduced size and fitted to slide in a recess or hole in the cap *f* of the vessel E. To this rod is secured a disk, B, with a rim which is plunged in mercury or other suitable fluid contained in an annular cup, *i*, formed in the vessel E by an inner rim, *h*. The upper end of the rod *d* is formed to receive weights *l*, which can be put on and taken off at pleasure by unscrewing the cap *f*.

The gas in the main has free access to the under surface of the disk B, and of course to the under surface of the valve *m*, and these being hung to the opposite ends of the lever *c*, and presenting an equal surface, whatever may be the pressure of the gas in the main, it must be equipoised, the pressure under the disk being precisely equal to the pressure under the valve. The weights *l* on the disk are regulated to keep the valve open against any desired and determined pressure above the pressure of the atmosphere, so that whenever the gas in the branch—that is, the gas beyond the valve—exceeds that pressure it will act on the upper surface and force it down, gradually reducing the aperture for the passage of the gas until the gas is reduced to the determined tension, and then the valve is again lifted by the preponderance of the weights *l* on the disk. Thus it will be seen that whatever may be the varying pressure of the gas in the main it never can affect the regulation, because it is balanced, and therefore leaves the valve to be governed in its position to regulate the flow of gas from the main into the branch by the pressure of the gas in the branch, the degree of which pressure is determined by the weights.

As the rim on the disk dips in mercury or other suitable fluid — mercury being preferred—as the valve rises and forces this rim into the mercury, its weight on the lever is thereby reduced, and vice versa. To compensate for this, that arm of the lever *c* to which the valve *m* is jointed is bent up so that as the valve rises and the rim of the disk is forced into the mercury the valve-arm of the lever shortens and looses its leverage in the same ratio that the disk looses its weight.

Fig. 4 represents a modification in which the valve *m* and disk B are on opposite ends of a rod, *n*, connected with one end of a lever, *c*, provided with a weight, *x*, at the other end to open the valve and determine the pressure of gas in the branch or house pipe. The gas from the main entering at *y* will act on the bottom of the valve and the top of the disk, and balance the valve so as to leave it under the control of the weight *x* and the pressure of the gas in the branch.

Fig. 3 of the accompanying drawings represents a vertical section of my said invention as above described, with an additional element. The vessel A connects with the main at *c* and with the house-branch at *b*. It is provided with a valve-seat, *a*, which is fitted to a rim or stricture, *l*, and secured in place by the screw-cap *b*, which forms the connection with the branch. The valve *d* is fitted to its seat and is provided with a central rod and weight, *f*, by which it is jointed to the lever *g* and by which it is kept in a horizontal plane.

The vessel E communicates with the vessel A below the valve by the neck C, and above the valve by a passage, *m*; and this vessel E is formed with two annular caps, *p* and *q*, to contain mercury or other suitable fluid, and to receive two rims, *r* and *s*, on the disk B. The annular cups communicate with each other by lateral passages *t*, so as to keep the mercury in the two cups at the same level. The disk is connected with the lever *g* by the vertical rod *i*, which is guided by playing in a hole in the cap *h*, as before described.

The surface of the disk within the inner rim, *s*, and exposed to the pressure of the gas in the main should be exactly equal to the surface of the valve exposed to the gas in the main, so as to balance this pressure whatever it may be and however much it may vary; and the surface of the disk between the inner and outer rims, *r* and *s*, and presented to the pressure of the gas in the branch should be made as large as convenient, so that the pressure of the gas in the branch shall act upon this in addition to the upper surface of the valve, for the greater the surface exposed to this pressure the more sensitive will be the instrument.

The rod of the disk must, as in the first example, be weighted, or made so much heavier than the valve as to determine the pressure of gas required in the branch. The pressure of the gas in the main being balanced on the valve and disk, it is obvious that the valve will be kept open by the preponderance of the weight on the disk end of the lever until the pressure of the gas in the branch exceeds the determined degree, and then it acts on the surface of the disk between the two rims and on the top of the valve, and having a large surface to act upon immediately begins to move the valve toward its seat, thereby gradually reducing the aperture for the passage of the gas until the proper tension is restored, and vice versa.

The advantage which this arrangement has over the first described is that by the addition of the element of presenting the disk to the pressure of gas in the branch as well as in the main the pressure of the gas in the main is neutralized, as in the first plan; but a much larger surface is presented for the pressure of the gas in the branch to act upon to close the valve whenever the pressure exceeds the degree to which the instrument is set.

The instrument last described can be made as sensitive with a very small valve as the other with a very large valve, and therefore the latter plan is better adapted to dwelling-houses and other localities supplying a very limited number of burners.

From the foregoing it will be seen that the instrument once set to a given pressure the gas will issue from the burners constantly at that pressure without regard to the variation of the pressure in the main or the number of burners in use.

It will be obvious that instead of making the two arms of the lever of equal lengths, and the surfaces of the valve and disk which are exposed to the pressure of the gas in the main, this may be varied, and one arm made longer by making the surfaces inversely of corresponding proportion.

I do not wish to be understood as limiting myself to the special construction specified, but claim the privilege of varying so long as I attain the same ends by substantially the same means.

What I claim as my invention, and desire to secure by Letters Patent, is—

1. Balancing the varying pressure of the gas in the main by connecting with the valve a disk which receives pressure from the main to balance the pressure on the valve substantially as described, or the equivalent therefor, in combination with the method, substantially as described, of governing the aperture through which the gas passes to the branch by the varying pressure of the gas beyond the valve, which governs the aperture, as described, so that when the pressure becomes too great the aperture shall be reduced, and vice versa.

2. In combination with the above, making the disk so that it shall be also acted upon by the varying pressure in the branch to assist in moving the valve to govern the aperture for the passage of the gas, substantially as specified, whereby the action of the instrument is rendered more sensitive and prompt as a governor.

WALTER KIDDER.

Witnesses:
WM. H. BISHOP,
CHAS. W. BAMBURGH.